US012042678B2

(12) United States Patent
McGill et al.

(10) Patent No.: US 12,042,678 B2
(45) Date of Patent: Jul. 23, 2024

(54) ADJUSTABLE LINEMAN SAFETY BELT

(71) Applicant: Bashlin Industries, Inc., Grove City, PA (US)

(72) Inventors: Bradley S McGill, Grove City, PA (US); Caleb Williams, Rouseville, PA (US); Brian Lander, Mercer, PA (US)

(73) Assignee: BASHLIN INDUSTRIES, INC., Grove City, PA (US)

( * ) Notice: Subject to any disclaimer, the term of this patent is extended or adjusted under 35 U.S.C. 154(b) by 531 days.

(21) Appl. No.: 17/077,600

(22) Filed: Oct. 22, 2020

(65) Prior Publication Data

US 2022/0126133 A1 Apr. 28, 2022

(51) Int. Cl.
*A62B 35/00* (2006.01)

(52) U.S. Cl.
CPC ...... *A62B 35/0025* (2013.01); *A62B 35/0006* (2013.01)

(58) Field of Classification Search
CPC .... A62B 35/0025; A61F 13/148; A61F 5/028; A61H 2201/5023; Y10T 24/2175; B60P 7/0846
See application file for complete search history.

(56) References Cited

U.S. PATENT DOCUMENTS

| | | | | | |
|---|---|---|---|---|---|
| 1,600,027 | A * | 9/1926 | Welsand | ............ | A62B 35/0031 224/663 |
| 1,642,911 | A * | 9/1927 | Thurnau | ............ | A62B 35/0006 224/268 |

(Continued)

FOREIGN PATENT DOCUMENTS

| | | |
|---|---|---|
| CN | 106473284 | 3/2017 |
| CN | 209090132 | 7/2019 |

(Continued)

OTHER PUBLICATIONS

Adjustable Short Back Belt™—20192CM, https://buckinghammfg.com/products/adjustable-short-back-belt/, accessed Sep. 25, 2020.

(Continued)

*Primary Examiner* — Jessica L Laux
*Assistant Examiner* — Kathleen M. McFarland
(74) *Attorney, Agent, or Firm* — Metz Lewis Brodman Must O'Keefe LLC

(57) ABSTRACT

An adjustable lineman safety belt having a body secured to a user with a belt tongue. A primary strap and auxiliary strap, each separately and independently adjustable, extend along the body spaced apart from one another and secured at each terminal end to a different D ring. The belt tongue shares D rings with the primary strap. Each strap includes an adjustment member permitting selective adjustment of the strap length, such as by sliding. Strap length adjustment similarly varies the distance between corresponding D rings, maintaining the weight distribution and balance of the overall device. Safety straps connect the auxiliary strap to the body while also permitting adjustment of the length. Drop straps connect the belt tongue to the body and safety strap for added safety in case of a fall. Covers also protect each of the adjustable members to prevent from accidental adjustment while the belt in is use.

19 Claims, 9 Drawing Sheets

(56) References Cited

U.S. PATENT DOCUMENTS 2,834,525 A * 5/1958 Shawgo .................... F16P 1/00 182/9
2,857,086 A * 10/1958 Chamberlin ....... A62B 35/0031 182/4
4,253,218 A * 3/1981 Gibbs ................... F16G 11/106 188/65.1
4,542,884 A * 9/1985 Dodge, Jr. ............. A62B 35/04 188/65.1
5,141,074 A * 8/1992 Sulowski ........... A62B 35/0031 182/9
5,184,696 A * 2/1993 Meed ................. A62B 35/0068 182/9
6,056,086 A * 5/2000 Gortan ..................... A62B 1/14 182/234
6,644,438 B1 * 11/2003 Chang .................... A63B 27/00 182/187
6,962,232 B2 * 11/2005 Diggle ............... A62B 35/0025 2/455
D604,912 S * 11/2009 Paul ............................. D29/124
7,631,728 B2 * 12/2009 Hill ....................... B63C 9/1255 182/3
8,181,381 B1 * 5/2012 Kelleher ................ A01K 97/10 224/922
8,225,905 B2 7/2012 Delaittre
8,325,053 B2 * 12/2012 Flynt .................. A62B 35/0025 182/4
8,398,134 B1 * 3/2013 Mortensen .............. B66F 19/00 294/191
8,459,518 B2 * 6/2013 Demsky ............. A62B 35/0012 224/628
8,464,832 B1 * 6/2013 Rullo ................. A62B 35/0075 182/5
8,887,866 B2 * 11/2014 Petty ...................... A63B 27/00 182/9
8,959,664 B2 * 2/2015 Johnson ............. A62B 35/0025 182/3
9,101,789 B2 * 8/2015 Schierenbeck .... A62B 35/0031
9,737,737 B2 * 8/2017 Rullo ................. A62B 35/0006
9,808,659 B2 * 11/2017 Chevalier .......... A62B 35/0025
10,016,633 B2 * 7/2018 Perner ................ A62B 35/0012
10,086,234 B2 * 10/2018 Petty ...................... A63B 27/02
10,099,073 B1 * 10/2018 Rullo ................. A62B 35/0025
10,112,064 B2 * 10/2018 Bouquier ........... A62B 35/0025
10,632,332 B2 * 4/2020 Anderson .......... A62B 35/0075
10,765,437 B1 * 9/2020 Antonio ............. A61B 17/1325
10,933,261 B1 * 3/2021 Rullo ................. A62B 35/0006
10,946,248 B1 * 3/2021 Rullo ..................... A63B 27/00
11,077,326 B2 * 8/2021 Roger ..................... F16B 45/04
11,497,948 B2 * 11/2022 Monahan ........... A62B 35/0031
2002/0026750 A1 * 3/2002 St. John .................. E05F 15/63 49/332
2004/0163898 A1 * 8/2004 Bergquist ............... A63B 27/00 188/65.2
2004/0262080 A1 * 12/2004 Reynolds ........... A62B 35/0025 182/3
2009/0188753 A1 * 7/2009 Liang ..................... A63B 27/00 182/133
2010/0051382 A1 * 3/2010 Schlief ............... A62B 35/0006 182/9
2010/0078261 A1 * 4/2010 Watts ................ A62B 35/0006 182/9
2010/0089694 A1 * 4/2010 Paul ....................... A63B 27/00 182/9
2010/0200329 A1 * 8/2010 Johnson ............ A62B 35/0025 182/3
2010/0231402 A1 * 9/2010 Flynt ...................... G08B 19/00 340/679
2011/0017546 A1 * 1/2011 Nichols, Jr. ........ A62B 35/0025 182/3
2011/0101061 A1 * 5/2011 Schierenbeck .... A62B 35/0025 224/661
2011/0214941 A1 * 9/2011 Petty ...................... A63B 27/00 182/9
2011/0290586 A1 * 12/2011 Goldmann, II ........ A63B 27/00 182/3
2011/0302685 A1 * 12/2011 Fay, III ............. A62B 35/0012 2/69
2012/0103724 A1 * 5/2012 Reynolds ........... A62B 35/0018 182/3
2012/0205193 A1 * 8/2012 Patel ...................... A63B 27/00 182/9
2012/0292129 A1 * 11/2012 Seman ............... A62B 35/0006 182/9
2015/0114753 A1 * 4/2015 Rullo ................. A62B 35/0037 182/9
2016/0045356 A1 * 2/2016 Grossman ............. A61F 13/128 602/75
2016/0332009 A1 * 11/2016 Chevalier .......... A62B 35/0018
2017/0216635 A1 * 8/2017 Stibilj ................ A62B 35/0018
2017/0291047 A1 * 10/2017 Bouquier ........... A62B 35/0012
2018/0272162 A1 * 9/2018 Levy .................. A62B 35/0025
2019/0105521 A1 * 4/2019 Roger ................ A62B 35/0037
2020/0114181 A1 * 4/2020 Monahan ........... A62B 35/0018

FOREIGN PATENT DOCUMENTS

FR 2910270 6/2008
GB 2474484 4/2011
KR 200187083 6/2008

OTHER PUBLICATIONS

Bashlin Industries, Inc., 77BCS Series: Pole Lariat; website printouts from http://www.bashlin.com/77bcs-pole-lariat.html; date visited Jan. 28, 2015; publisher Bashlin Industries, Inc.; copyright 2014-15 Bashlin Industries, Inc.; Grove City, Pennsylvania; USA; 2 pages (copy enclosed).

* cited by examiner

ADJUSTABLE LINEMAN SAFETY BELT

FIELD OF THE INVENTION

This invention relates to lineman safety and tool belts, and more particularly, to a lineman's belt that is adjustable and has additional safety features relating to the adjustable features.

BACKGROUND

Lineman must climb telephone or utility poles to construct or maintain electrical power lines, telecommunications lines and distribution lines. They wear a lineman belt around their waist for the dual purpose of carrying tools and to clip to a safety or climbing rig. The climbing rig is a rope or similar structure that goes around the pole and helps the lineman stay in contact with the pole. It is clipped to the lineman belt with carabiners or other clips selectively fastened to D rings on the belt. Safety rigs are also used to ensure that the lineman does not fall if he loses his grip or his gaffs cuts out from the pole.

As the lineman climbs the pole and encounters an obstacle, such as a cross arm, the various rigs must be unclipped and reclipped to the D rings as the lineman passes the obstacle. Previous versions of lineman belts include a single set of D rings, known as 2D belts, have one D ring at each end of the belt. More recent versions have two belts, with a set of D rings on each end of both straps and are therefore referred to as 4D belts. The two belts in such versions are identified as primary and secondary, with the primary typically being the larger to accommodate tools and tool accessories.

Lineman belts are typically constructed of leather, nylon or a combination of both. In the past, the belts were sized similar to a man's dress belt, in inches, with fixed adjustment holes. This allows only limited adjustment, however, which is dictated by the spacing and number of holes. It does not accommodate the gaining and losing of weight or changes in bulk due to seasonal clothing. A lineman's work is outdoors in the weather, subject to rain, ice and winds, and is highly dangerous even in the best of conditions. Their safety while on the job is of extreme importance, and their gear needs to be able to accommodate them regardless of what they need to wear to protect themselves for the conditions of the day or as they gain or lose weight over their careers. The existing prefixed adjustment holes of lineman's belts are not well-suited to addressing the fluctuating needs of the individual lineman to maintain the D rings in an ideal position.

Some safety harnesses, such as those used by climbers and emergency rescuers, are known to be adjustable. For instance, the emergency harness disclosed in United Kingdom Patent Number GB2474484 and the safety harness of U.S. Pat. No. 7,631,728 demonstrate that load-bearing harnesses can include adjustable straps. Even hip belts, such as those disclosed in U.S. Pat. No. 8,459,518 which are intended to be worn around the waist and to couple to other items such as backpacks. However, none of these relate to the specific needs of the lineman, requiring both support and safety for long periods of time in all weather conditions.

So far, there is only one adjustable lineman belt currently on the market, the Adjustable Short Back Belt™, Model #20192CM made by Buckingham Manufacturing Co., Inc. (Binghamton, New York). This 4D lineman belt has two belt straps, each bearing a set of D rings. Both the belts are adjustable to vary their length. However, one of the adjustable belts is only slidably connected to the corresponding D rings. When the belt is adjusted, it is pulled through the D rings to reestablish its position on the body. Because of this, the distance between the D rings does not change when the corresponding belt is adjusted. Therefore, as the belt is lengthened, the corresponding D rings begin to drift from being centered on the midpoint of the body when the device is worn. As the circumference expands, this offset drift becomes increasingly exaggerated. This offset drift from center translates to an offset weight distribution, leading to uncomfortable wear over time, awkward positioning for access to tools, undue wear and tear on the device from the uneven weight and load distribution, and increased safety risks.

There is therefore still room for improvement in the field of lineman safety belts, specifically adjustable belts.

SUMMARY

An adjustable lineman safety belt is disclosed having a primary strap and auxiliary strap both separately attached to a common body and each independently and selectively adjustable to lengthen or shorten the corresponding strap. This allows the lineman belt to be adjusted to fit a user despite increased or decreased bulk from seasonal clothing or gear necessary for weather conditions, such as sweaters, coats, and insulated pants, or from simple weight gain or loss experienced over time in the industry. This flexibility also reduces the number of belts that must be stocked by retailers.

Each adjustable strap is also fixedly secured to a D ring at each end. The change in length of the primary or auxiliary strap therefore similarly varies the distance between the associated D rings, maintaining the D rings at equidistant positions from the midline of the body of the lineman belt and therefore maintaining the weight distribution and the safety and integrity of the belt. Despite being adjustable, the primary and auxiliary straps are also movably secured to the body of the belt.

Each of the primary and auxiliary straps includes a fixed portion and an adjustable portion, with an adjustment member connecting the two portions. The adjustment members are buckles or similar hardware that permit selective securing and release of the adjustable portion of the strap thereto. The adjustable portion of each strap is therefore selectively moveable relative to the adjustment member, such as by sliding, until a desired length is achieved to lengthen or shorten the corresponding strap. Sizing guides are located on or in proximity to each of the primary and auxiliary straps to facilitate reliable and repeatable changes in strap length. The lineman belt also includes a cover disposable in at least partially covering relation to the adjustment member on each of the primary and auxiliary belts to protect the adjustment members from misadjustment or inadvertent interference while the belt in is use. The cover(s) may be selectively movable between an open position providing full access to the adjustment member and a closed position in which the cover is positioned in covering relation over the adjustment member to protect it and the adjustable portion of the corresponding strap from being accidentally bumped out of secure position when the belt is in use.

Safety straps are also provided and connect the auxiliary strap to the body of the lineman belt while also permitting movement for varying the length of the auxiliary strap. Each end of the auxiliary strap may have a safety strap which is secured to the body. The safety straps therefore prevent full separation of the auxiliary strap from the lineman belt despite its adjustability. Similarly, drop straps connect the belt tongue to the body and/or safety strap, preferably at each end of the body, for added security in case of a fall. The drop straps also help shore up the integrity of the body against ripping, pulling, tearing and similar damage which may be caused by prolonged stress from load-bearing weight.

The adjustable lineman safety belt, together with its particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION

Figure 1:
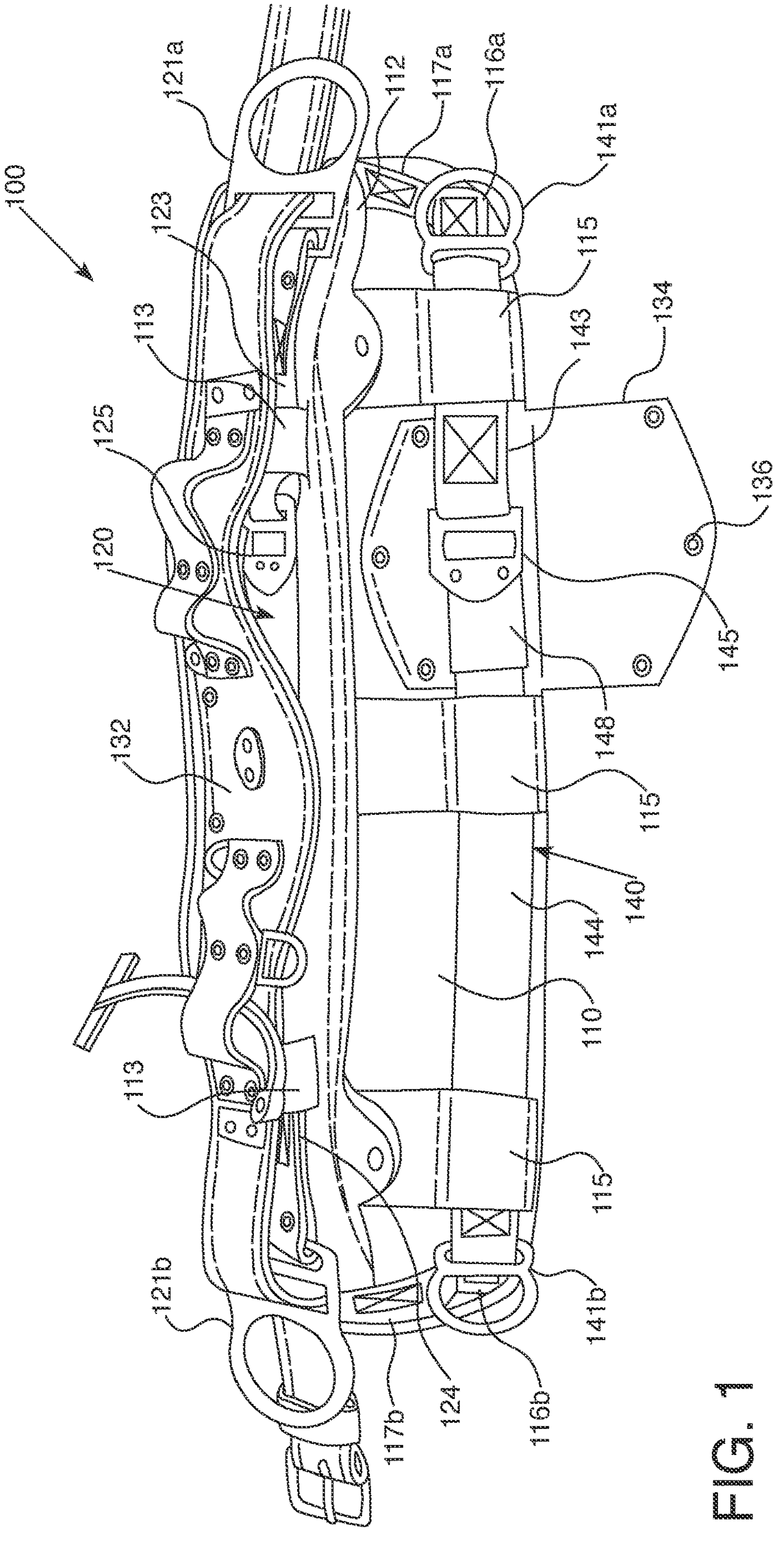
FIG. 1 is a perspective view of the adjustable lineman safety belt of the present invention.

As shown in the accompanying drawings, and specifically FIG. 1, the present invention is directed to an adjustable lineman safety belt 100 having a body 110 of a longitudinal length. The body 110 forms the base of the adjustable lineman safety belt 100 to which the other components are attached. It is therefore made of durable material that can withstand heavy loads and may include layers of material for load bearing and comfort, such as but not limited to leather, nylon, cloth and other suitable material. In some embodiments, the body 110 may also include a cushion on the inner side thereof which contacts the user when worn to increase user comfort. It is positioned against the waist and/or lower back of a user, at least partially encircling the torso slightly above the hips when worn.

The adjustable lineman safety belt 100 includes a primary strap 120 movably attached to the body 110 at least through terminal D rings 121*a*, 121*b*. The primary strap 120 extends along the length of the body 110 between a first primary D ring 121*a* at one end and a second primary D ring 121*b* at the opposite end. Accordingly, the primary strap 120 defines the distance between the first and second primary D rings 121*a*, 121*b*. The primary strap 120, also referred to as the "dee piece" or "D saddle" in the lineman industry, runs near one edge or perimeter of the body 110 when the lineman safety belt 100 is worn, which may be the top or bottom of the belt 100 depending on the preference of the wearer. In some embodiments, as in FIGS. 1, 11 and 15, the primary strap 120 may be movably secured to a belt pad 112 through primary sleeves 113 which loop over the primary strap 120 from the belt pad 112 and keep the primary strap 120 attached to the belt pad 112 while still allowing the primary strap 120 to be adjusted and movable thereon. The belt pad 112 is in turn affixed to the body 110, such as through stitching, to secure the primary strap 120 to the body 110. In some embodiments, the primary strap 120 may also be secured directly to the belt pad 112 and/or body 110.

Figure 11:
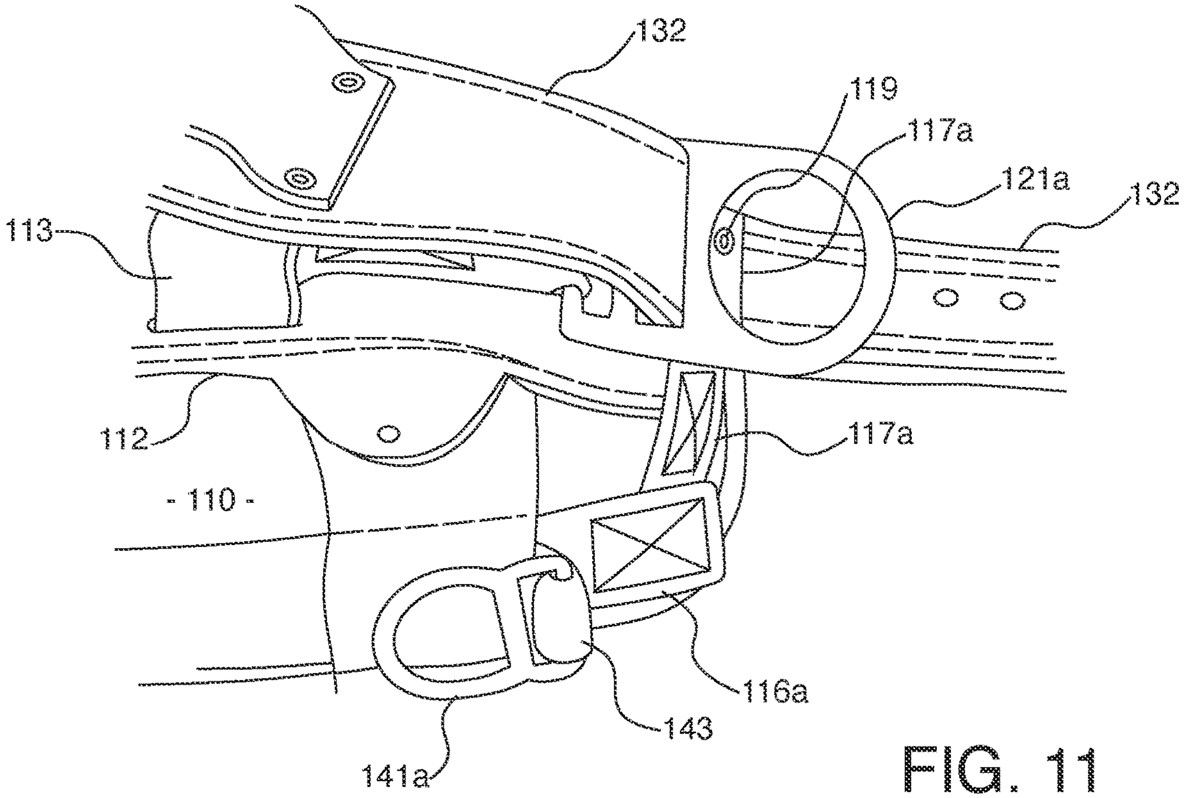
FIG. 11 is a perspective view of the one end of the belt body showing the auxiliary strap, first auxiliary D ring, belt tongue, first primary D ring, safety strap and drop strap.
Figure 15:
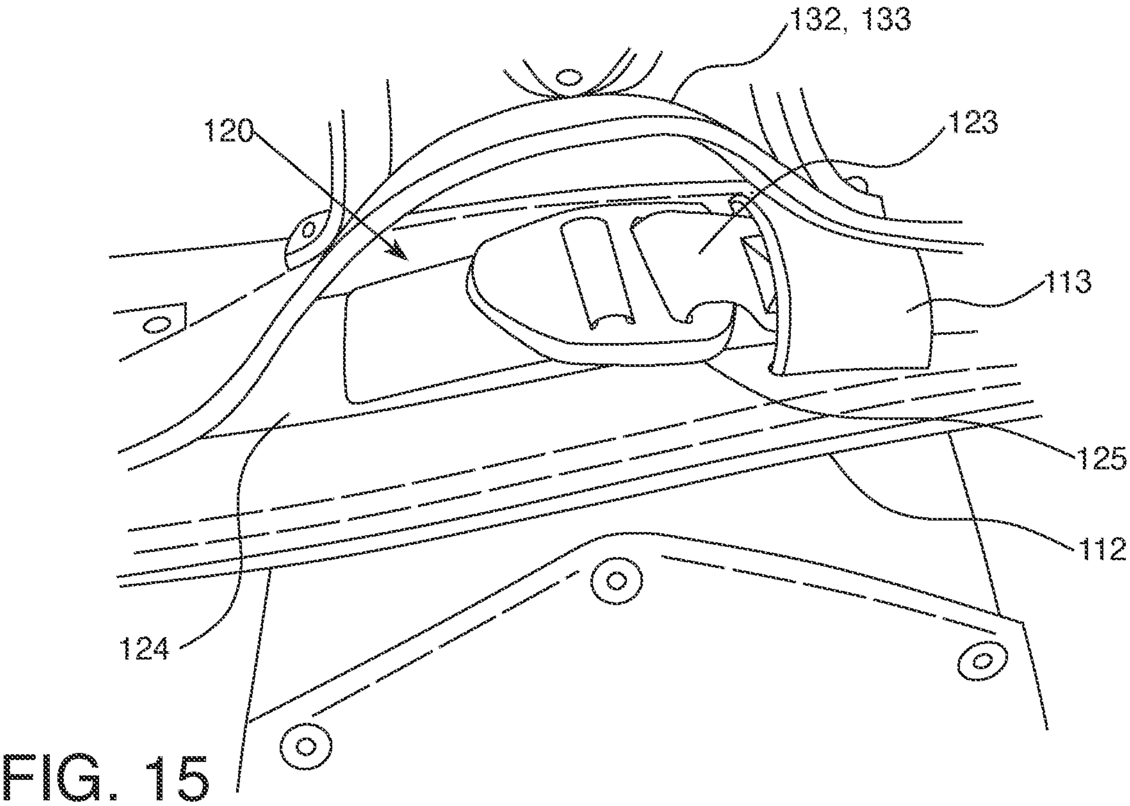
FIG. 15 is a detailed view of the primary adjustment member and first cover.

A belt tongue 132 floats over and partially covers the primary strap 120, as shown in FIGS. 1, 11 and 15. The belt tongue 132 is made of durable material, such as nylon, and is configured to receive and retain lineman tools, such as in the various loops formed by the belt tongue 132. It is slidably retained in the first and second primary D rings 121*a*, 121*b*, preferably through different apertures than the ones through which the primary strap 120 are secured, thus permitting the belt tongue 132 to be selectively moved relative to the primary strap 120 for positioning of the body 110 on the wearer. The primary strap 120 and belt tongue 132 may run coaxially with one another, as shown in FIG. 1, but are separate from one another though they share the same first and second primary D rings 121*a*, 121*b*. Accordingly, the belt tongue 132 may extend adjacent to the primary strap 120. The belt tongue 132 extends beyond the first and second primary D rings 121*a*, 121*b* and the body 110 to fully encircle the waist of the user when worn and may terminate in a buckle and predefined sizing holes, as is customary in traditional belts. The belt tongue 132 is the main feature by which the adjustable lineman safety belt 100 attaches to the wearer by fully encircling the waist or torso of the wearer and securing to itself. Because the belt tongue 132 shares the same primary D rings 121*a*, 121*b* with the primary strap 120 which is connected to the body 110 through the primary sleeves 113, the belt tongue 132 also serves to connect the entire adjustable lineman safety belt 100 to the wearer. The primary D rings 121*a*, 121*b* are the attachment points for the main climbing rig that the lineman will use to ascend, descend and remain aloft. Therefore, the primary D rings 121*a*, 121*b*, belt tongue 132, belt pad 112 and body 110 are the main load-bearing components of the adjustable lineman safety belt 100.

The adjustable lineman safety belt 100 also includes an auxiliary strap 140 attached to and extending along the length of the body 110. The auxiliary strap 140 is spaced apart from the primary strap 120 on the body 110, and in at least one embodiment is substantially parallel to the primary strap 120. For instance, the auxiliary strap 140 extends along the opposite longitudinal perimeter of the body 110 from the primary strap 120. Though described at the perimeter of the body 110, the primary and auxiliary straps 120, 140 may be proximate to, adjacent or near the perimeter and are not necessarily flush with the perimeter of the body 110. The auxiliary strap 140 extends between and is securely affixed to a first auxiliary D ring 141*a* at one terminal end and to a second auxiliary D ring 141*b* at the opposite terminal end. Accordingly, the auxiliary strap 140 defines the distance between the first and second auxiliary D rings 141*a*, 141*b*. The auxiliary D rings 141*a*, 141*b* are used to connect the safety rig which may act as a fall restriction device in case of emergency. The auxiliary strap 140 and D rings 141*a*, 141*b* must be able to catch the wearer in the event of an unexpected fall or as a back-up to the primary strap 120.

Because the D rings are used as attachment points for climbing and safety rigs that enable a user to ascend and descend a utility pole, the D rings must be able to distribute weight evenly across the body 110. The D rings in each respective pair are therefore disposed substantially equidistant from the midpoint of the body 110 when worn by a user, with the first and second primary D rings 121*a*, 121*b* being substantially equidistant from one another and the first and second auxiliary D rings 141*a*, 141*b* being substantially equidistant from one another. This allows for even weight distribution over the body 110 and stabilizes the entire assembly. The D rings 121*a*, 121*b*, 141*a*, 141*b* may be any size or gauge. The primary D rings 121*a*, 121*b* may be the same size as the auxiliary D rings 141*a*, 141*b* in some embodiments, though in at least one embodiment the primary D rings 121*a*, 121*b* may be larger in size than the auxiliary D rings 141*a*, 141*b*. The D rings 121*a*, 121*b*, 141*a*, 141*b* may be made of any suitable material, such as but not limited to steel.

The primary and auxiliary straps 120, 140 each include a fixed portion of a fixed length and an adjustable portion of adjustable or variable length, each secured at one end to a D ring. These are best shown in the depictions in FIGS. 2 and 3 before the straps 120, 140 are attached to the body 110 during manufacturing. For instance, the primary strap 120 includes a fixed portion 123 affixed at one end to the first primary D ring 121*a* and an adjustable portion 124 affixed at one end to the second primary D ring 121*b*. Similarly, the auxiliary strap 140 includes a fixed portion 143 affixed at one end to the first auxiliary D ring 141*a* and an adjustable portion 144 affixed at one end to the second auxiliary D ring 141*b*. The straps 120, 140 and each portion thereof may be made of any suitable durable material, such as but not limited to nylon. They may each be secured to the respective D ring by any suitable method, such as by looping through the D ring and being secured back onto itself, such as by stitching, adhesive or other permanent method of affixation.

Figure 2:
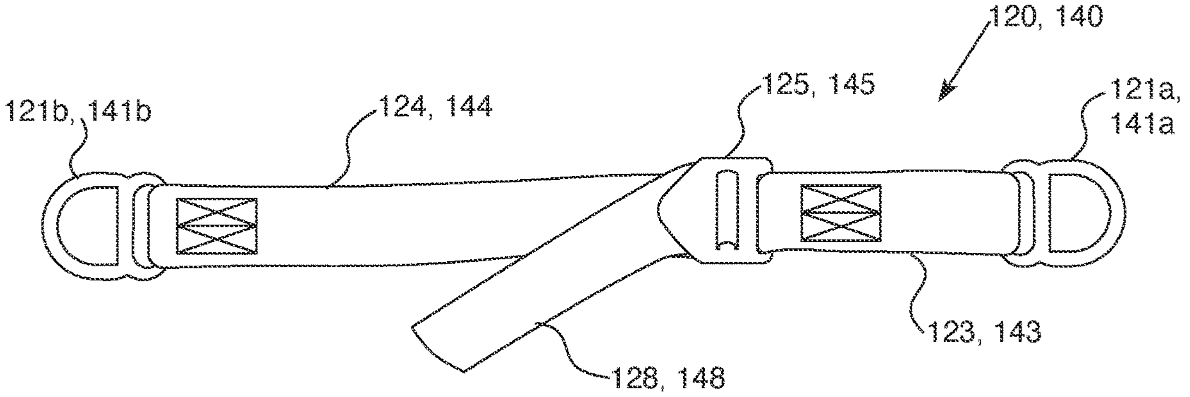
FIG. 2 is a plan view of the primary or auxiliary strap, shown prior to being mounted on the body of the lineman safety belt for ease of viewing.
Figure 3:
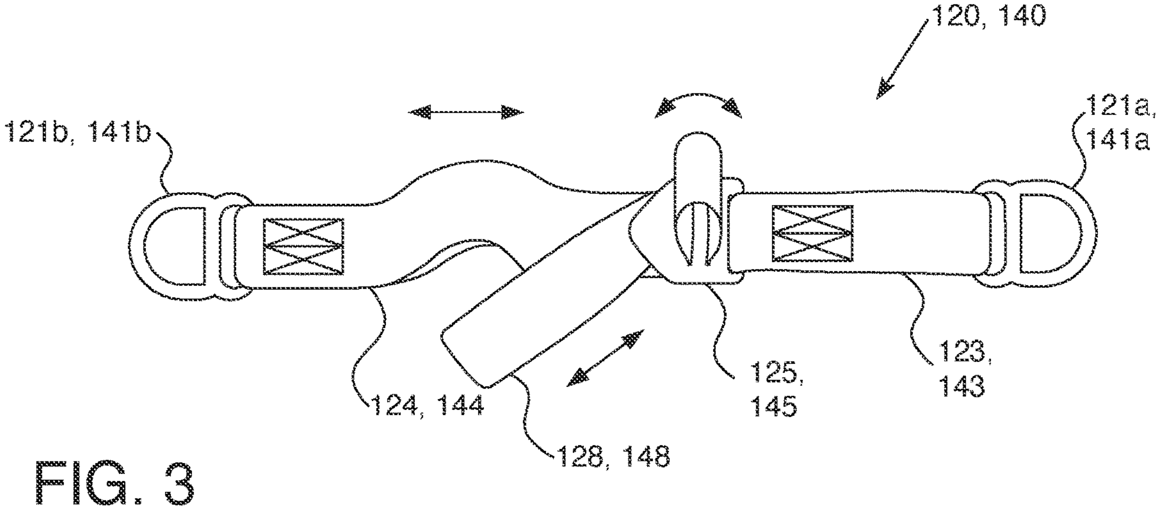
FIG. 3 is a plan view of the primary or auxiliary strap of FIG. 2, showing the adjustment mechanism of the strap.

Also show in FIGS. 2 and 3, each strap 120, 140 also includes an adjustment member 125, 145 interposed between and connecting the respective fixed and adjustable portions thereof. Specifically, the fixed portion 123 of the primary strap 120 extends between and is securely affixed to the first primary D ring 121*a* on one end and to the first adjustment member 125 on the other end. It may be securely affixed to the first primary D ring 121*a* and to the first adjustment member 125 by the respective end being looped through the hardware and secured back onto itself, such as by stitching, adhesive or other suitable method. The adjustable portion 124 of the primary strap 120 extends between and is selectively releasably secured to the first adjustment member 125 at one end and affixed to the second primary D ring 121*b* on the other end by looping and stitching back onto itself or other suitable method. Similarly, the fixed portion 143 of the auxiliary strap 140 extends between and is securely affixed to the first auxiliary D ring 141*a* on one end and to the second adjustment member 145 on the other end, such as through looping and stitching back onto itself. The adjustable portion 144 of the auxiliary strap 140 extends between and is selectively releasably secured to the second adjustment member 145 at one end and is affixed to the second auxiliary D ring 141*b* on the other end, also being stitched onto itself.

The adjustment members 125, 145 may be a buckle, slide or other suitable fastener capable of selectively and releasably securing a length of strap. In some embodiments, the adjustment members 125, 145 may include distinct apertures through which the fixed portions 123, 143 or adjustable portions 124, 144 of the first and second straps 120, 140 may pass through in securing to different sections of the adjustment members 125, 145. In certain embodiments, the adjustment members 125, 145 may include teeth to facilitate gripping of the straps, though these are not required.

Each strap 120, 140 is adjustable separately and independently of the other. This allows the dimension around the wearer provided by the top and bottom of the adjustable lineman safety belt 100 to be adjusted independently, which is helpful since the straps 120, 140 hit at different points on the wearer such as the waist, torso or hips. Each of these areas may naturally have different dimensions according to anatomical differences in the wearer. They may also be subject to different levels of modification by clothing that can change with the weather conditions. For instance, adding a sweater will necessitate the adjustment around the torso but not necessarily around the hips. A person may put on or lose weight more around the waist than other sections, requiring greater adjustment in this area than the others. In addition, the straps 120, 140 do not need to be adjusted in the same direction as one another. Thus, one can be shortened and the other lengthened or kept at a constant length. Having the primary and auxiliary straps 120, 140 separately adjustable independently of one another provides maximum flexibility of use to this adjustable lineman safety belt 100.

The straps 120, 140 may each be varied in length by loosening the adjustable portion 124, 144 within the respective adjustment member 125, 145, thereby creating slack in the adjustable portion 124, 144 and in the looped portion passing through the adjustment member 125, 145, as shown in FIG. 3. The loose end of the adjustable portion 124, 144, also referred to as the tail 128, 148, may then be pulled away from the adjustment member 125, 145 to tighten the adjustable portion 124, 144 down onto the adjustment member 125, 145 to shorten the overall length of the adjustable portion 124, 144. The adjustable portion 124, 144 can be lengthened by reversing this process. Accordingly, each strap 120, 140 may be slidably affixed and movable relative to the adjustment member 125, 145 to vary the length. Because each strap 120, 140 is secured at each end to primary D rings 121*a*, 121*b* and auxiliary D rings 141*a*, 141*b*, respectively, adjusting the length of the primary strap 120 also adjusts the distance between the primary D rings 121*a*, 121*b*, and adjusting the length of the auxiliary strap 140 adjusts the distance between the auxiliary D rings 141*a*, 141*b*. Therefore, the distance between primary D rings 121*a*, 121*b* and the distance between auxiliary D rings 141*a*, 141*b* can be adjusted separately and independently of the other. Though shown alone in FIGS. 2 and 3 for ease of reference, it should be understood that the primary and auxiliary straps 120, 140 are each adjustable when installed on the adjustable lineman safety belt 100.

As the length of the primary strap 120 and/or auxiliary strap 140 is varied, the corresponding distance between D rings 121*a*, 121*b*, 141*a*, 141*b* will similarly be varied. This allows the D rings 121*a*, 121*b*, 141*a*, 141*b* to remain substantially equidistant from the lateral midpoint of the body 110 despite the variation in length. This is a departure from other adjustable lineman belts, such as the Adjustable Short Back Belt™ made by Buckingham, which does not allow for the distance between the D rings to be similarly adjusted as the straps lengthen or shorten. In the Buckingham adjustable belt, for instance, the top belt or strap slides through the corresponding D rings and is not affixed thereto. Accordingly, the distance between D rings on the Buckingham belt does not change as the corresponding strap is lengthened or shortened. As the top belt or strap is adjusted to increase in length, creating a widening circumference about the wearer, the corresponding D rings will begin to drift or migrate so they are no longer centered on or equidistant from the lateral midpoint of the belt body. A similar shift to off-center occurs when the top belt is shortened, but in the opposite direction. This offset orientation is uncomfortable for the wearer, distributing the weight of the wearer unevenly. This differential weight distribution can lead to unsafe conditions, including damage to the device and possible fall. It also can impair accessibility of the tools carried by the belt tongue since they will no longer be centered on the device. The present invention solves these problems by making the distance between each set of D rings adjustable with the respective primary and auxiliary straps 120, 140 so the orientation of the D rings 121*a*, 121*b*, 141*a*, 141*b* is always substantially equidistant from the lateral midpoint of the body 110 for even weight distribution to maintain balance, safety and accessibility, regardless of how long or short the straps 120, 140 are made.

Figure 4:
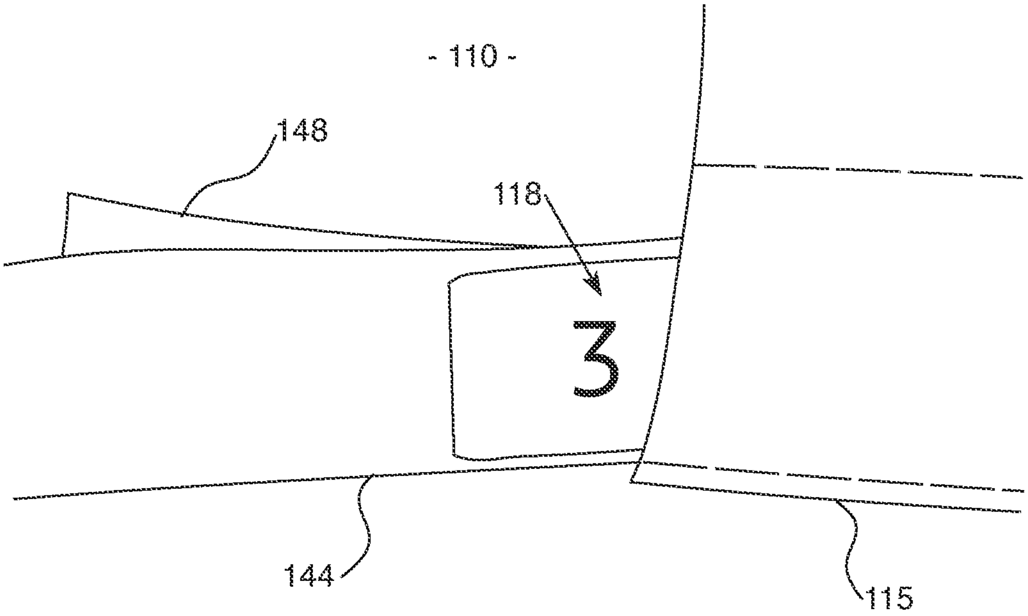
FIG. 4 is a detailed view of the auxiliary strap showing one embodiment of a sizing guide.
Figure 5:
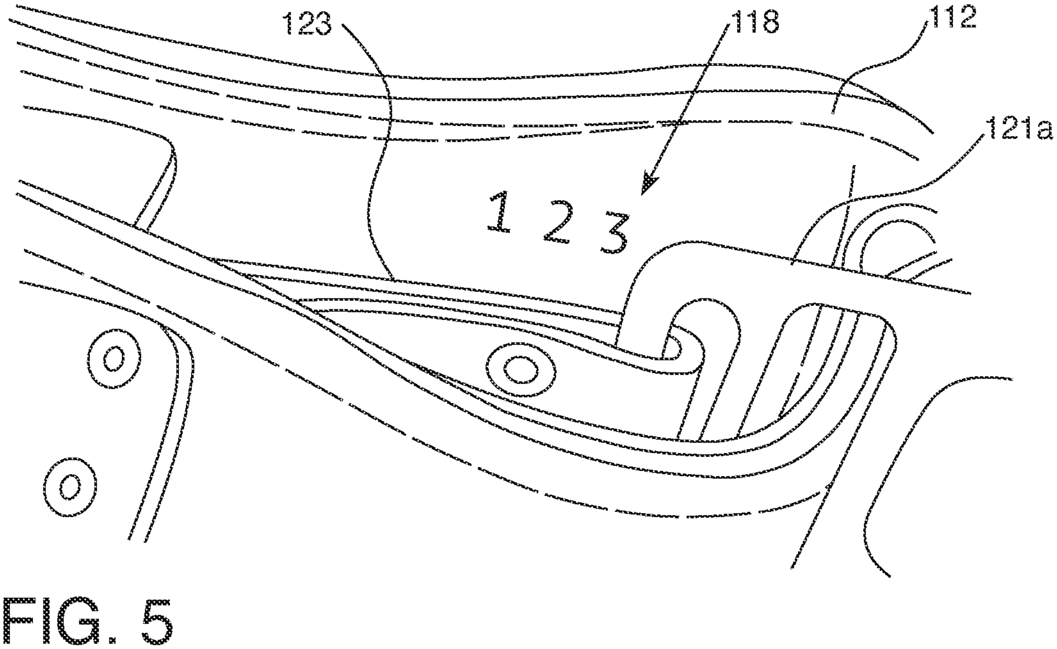
FIG. 5 is a detailed view of the primary strap and belt pad, showing another embodiment of the sizing guide.

The adjustable lineman safety belt 100 may also include sizing guides 118 for each strap 120, 140 to indicate various sizes. The indicia of the sizing guide 118 act as reference points for the user when adjusting the straps 120, 140 for quickly and reliably reaching a desired size. They may therefore also indicate different distances between the corresponding primary D rings 121*a*, 121*b* or auxiliary D rings 141*a*, 141*b*. The sizing guide 118 may be located on the straps themselves, such as on the adjustable portion 144 of the auxiliary strap 140 as seen in FIG. 4, on the belt pad 112 as seen in FIG. 5, or on the body 110 (not shown). The sizing guide 118 may be positioned to provide reference of the length of the corresponding proximate strap 120, 140 relative to itself, such as when the sizing guide 118 are located on the tail 128, 148 of the adjustable portion 124, 144, or they may provide sizing information relative to another component of the lineman safety belt 100, such as relative to the adjustment member 145 as in FIG. 4 or to the first primary D ring 121*a* as in FIG. 7. Of course, the sizing guide 118 may also provide reference with respect to the adjustment member 125 or any of the D rings 121*a*, 121*b*, 141*a*, 141*b*. The sizing guide 118 may be provided in any suitable form, including notches, holes, apertures, numbers, letters, colors and the like.

The adjustable lineman safety belt 100 also includes sleeves which are secured to the body 110 and slidably receive and retain a portion of the strap 120, 140 therein. For instance, as previously discussed the adjustable lineman safety belt 100 may include at least one primary sleeve 113, shown in FIGS. 1, 11 and 15 that loops over the primary strap 120 from the belt pad 112 to retain the primary strap 120 on the belt pad 112 and thus body 110. There may be a primary sleeve 113 covering the fixed portion 123 and another primary sleeve 113 covering the adjustable portion 124 of the primary strap 120. The sleeves 113 may also cover the tail 128, keeping it out of the way when the adjustable lineman safety belt 100 is in use. The sleeves 113 may also limit the amount or degree to which the primary strap 120 may be shortened, being dimensioned to permit passage of the strap 120 but restrict passage of the primary D rings 121*a*, 121*b* and the first adjustment member 125 therethrough. Therefore, the primary sleeve(s) 113 may also limit or control the minimal or shortest distance between the primary D rings 121*a*, 121*b*.

Similarly, the adjustable lineman safety belt 100 may also include at least one auxiliary sleeve 115 affixed to the body 110 such as by stitching and loops over the auxiliary strap 140 to movably secure the auxiliary strap 140 to the body 110. The auxiliary sleeve(s) 115 are configured and dimensioned to allow the strap 140 to pass therethrough and be moveable therein, such as slidably moveable. There may be an auxiliary sleeve 115 covering the fixed portion 143 and another covering the adjustable portion 144 of the auxiliary strap 140 and may be dimensioned to receive the tail 148 of the adjustable portion 144 to keep it out of the way during use. The auxiliary sleeves 115 may be narrower in dimension than the auxiliary D rings 141*a*, 141*b* and the second adjustment member 145 to permit passage of the auxiliary strap 140 therethrough but restrict passage of the connected auxiliary D rings 141*a*, 141*b* and the second adjustment member 145. In this way, the auxiliary sleeve(s) 115 limits or controls the minimal or shortest length the auxiliary strap 140 may take, and therefore the minimal distance between the auxiliary D rings 141*a*, 141*b*.

Figure 7:
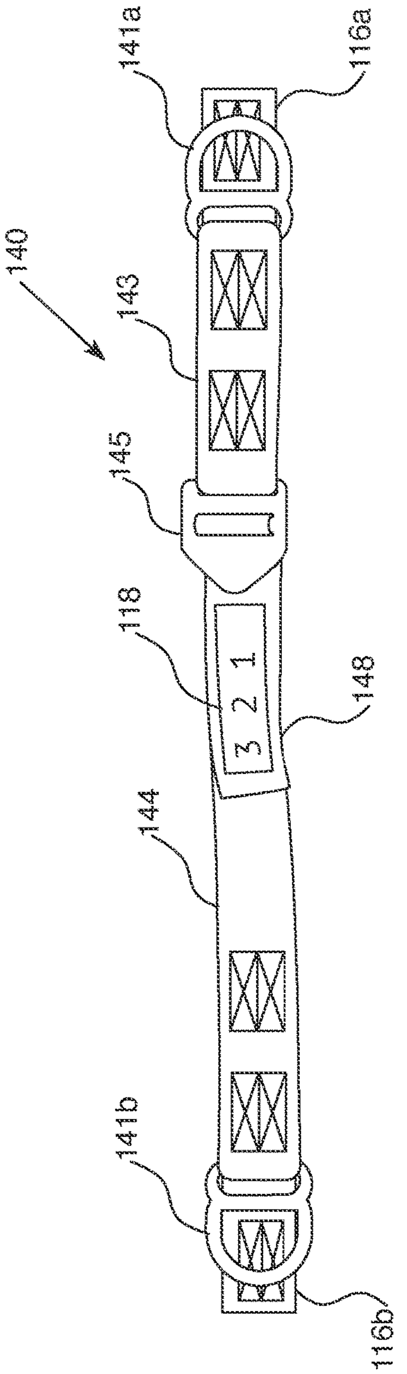
FIG. 7 is a plan view of the safety straps and auxiliary strap of FIG. 6, shown as affixed to the body.
Figure 6:
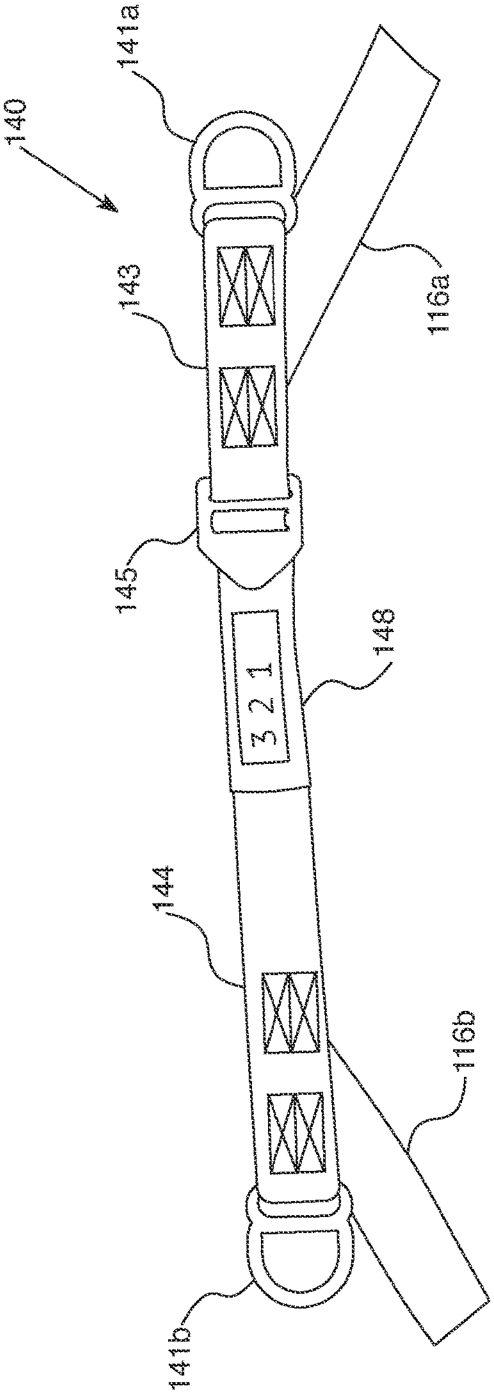
FIG. 6 is a plan view of the safety straps attached to the auxiliary strap.

The adjustable lineman safety belt 100 also includes at least one safety strap 116 having a length and securely affixed to the body 110 and to the auxiliary strap 140, as shown in FIGS. 6-9 and FIG. 1. This safety strap 116 keeps the auxiliary strap 140 attached to the body 110 even if the auxiliary sleeves 115 come loose or fail. For instance, the safety strap 116 is securely affixed to the body 110 at one end, such as through stitching through the body 110, and is securely affixed to the auxiliary strap 140 at the other end, also by stitching therethrough or other secure fastening. In at least one embodiment, as shown in FIGS. 6 and 7, each end of the auxiliary strap 140 has its own safety strap 116. For instance, the fixed portion 143 is connected to a safety strap 116*a* proximal to the first auxiliary D ring 141*a* and the adjustable portion 144 is connected to a different safety strap 116*b* proximal to the second auxiliary D ring 141*b*.

Figure 9:
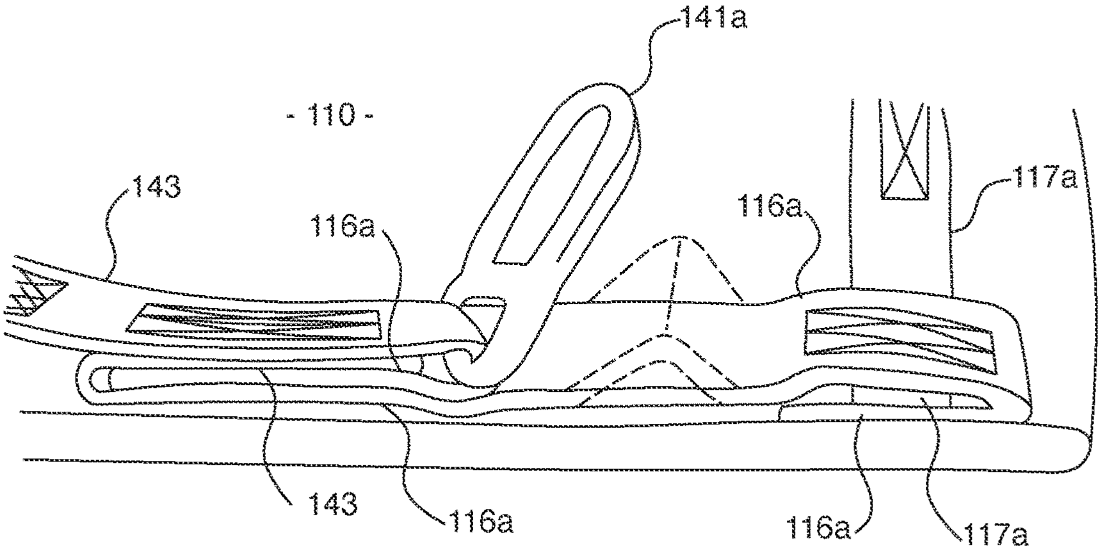
FIG. 9 is a side elevation view of the end of the auxiliary strap and belt body of FIG. 8, showing the safety strap assembled with and connected to the auxiliary strap and body, and further showing the drop strap assembled with and connected to the safety strap.
Figure 10:
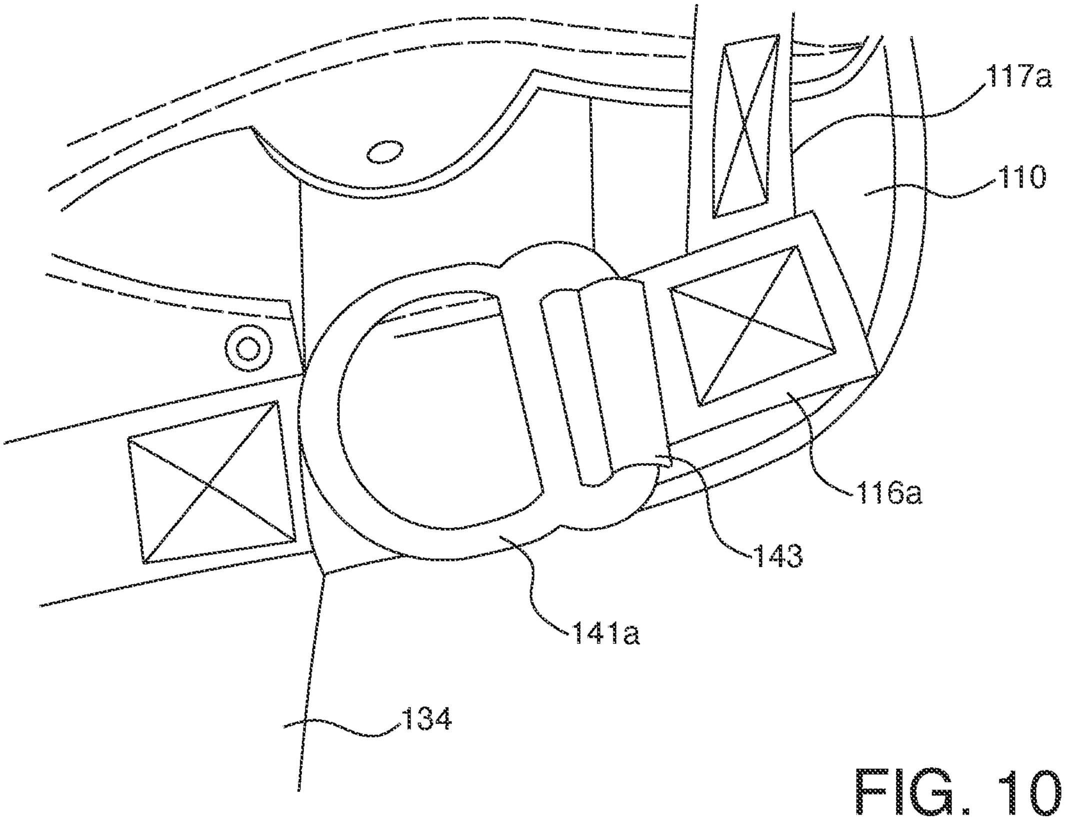
FIG. 10 is a plan view of one end of the belt body showing the auxiliary strap, first auxiliary D ring, safety strap and drop strap.

FIGS. 6-9 show how the safety strap 116 connects to the auxiliary strap 140, illustrating one side of the adjustable lineman safety belt 100. For instance, the fixed portion 143 of the auxiliary strap 140 is looped over the lower portion of the first auxiliary D ring 141*a* and the terminal end of the fixed portion 143 is aligned underneath itself. One terminal end of the safety strap 116*a* is inserted longitudinally between the overlapping sections of the fixed portion 143 so that the safety strap 116*a* is coaxial with the fixed portion 143 and extends therefrom. These three layers are then stitched together to secure the terminal end of the safety strap 116*a* sandwiched between the overlapping sections of the fixed portion 143 proximal to the first auxiliary D ring 141*a*. This stitching also secures the fixed portion 143 to the first auxiliary D ring 141*a*. The remaining length of the safety strap 116*a* extends away from this joined section. The opposite terminal end of the safety strap 116*a* is looped back on itself and is stitched to the body 110, as shown in FIG. 10. Accordingly, the safety strap 116*a* indirectly, but securely, affixes the auxiliary strap 140 to the body 110 of the adjustable lineman safety belt 100. The safety strap 116*a* is only secured to the body 110 at one terminal end, so the remaining length of the safety strap 116*a* is capable of slight movement, such as by slackening as shown in dotted lines in FIG. 9, when the corresponding first auxiliary D ring 141*a* is moved as the auxiliary strap 140 is adjusted. However, because the safety strap 116*a* is affixed to the body 110, it also limits the maximal extension or length of the auxiliary strap 140 so it cannot be over adjusted. It therefore also limits the maximum distance between the auxiliary D rings 141*a*, 141*b* so they cannot be extended too far from one another. Though not shown, the same description applies to connecting the safety strap 116*b* to the adjustable portion 144 of the auxiliary strap 140 at the second auxiliary D ring 141*b* and to the body 110.

In at least one embodiment, as shown in FIGS. 10-13, the adjustable lineman safety belt 100 also includes at least one drop strap 117 having a length and securely affixed to the body 110 and to the belt tongue 132. The drop strap(s) 117 is also fixedly secured to the safety strap 116 on the same side of the body 110. The drop strap(s) 117 provide additional support in the event of slippage or fall and ensures that the auxiliary strap 140 will not separate from the body 110. Each side of the body 110 may include a drop strap 117*a*, 117*b*, as illustrated in FIG. 1. Further description will now be provided with respect to the drop strap 117*a* on the right side of the body 110 for illustration, though it should be understood that such description applies similarly to the drop strap 117*b* on the other side.

Figure 8:
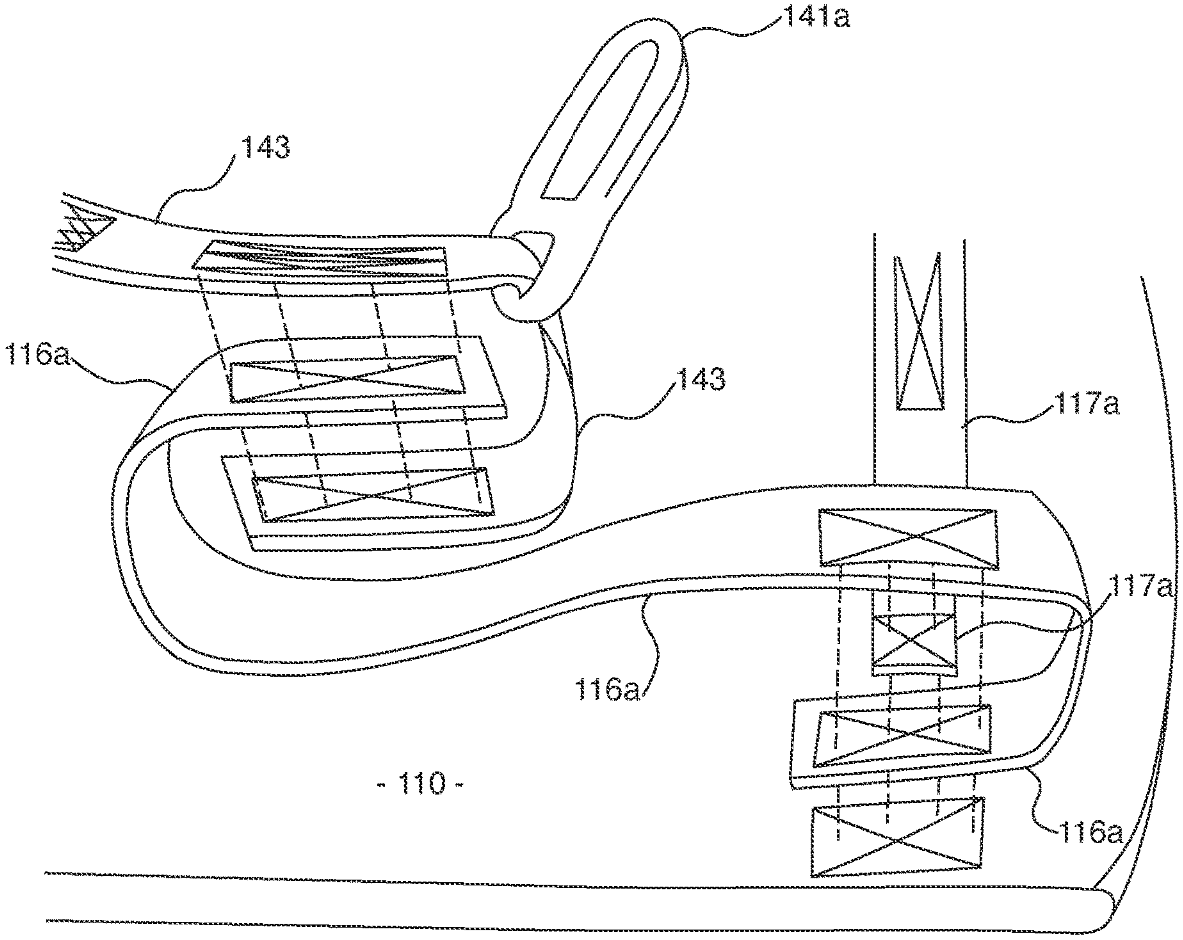
FIG. 8 is an exploded view of one end of the auxiliary strap showing the attachment of the safety strap to the auxiliary strap and the body of the belt, and further showing the attachment of a drop strap to the safety strap.
Figure 12:
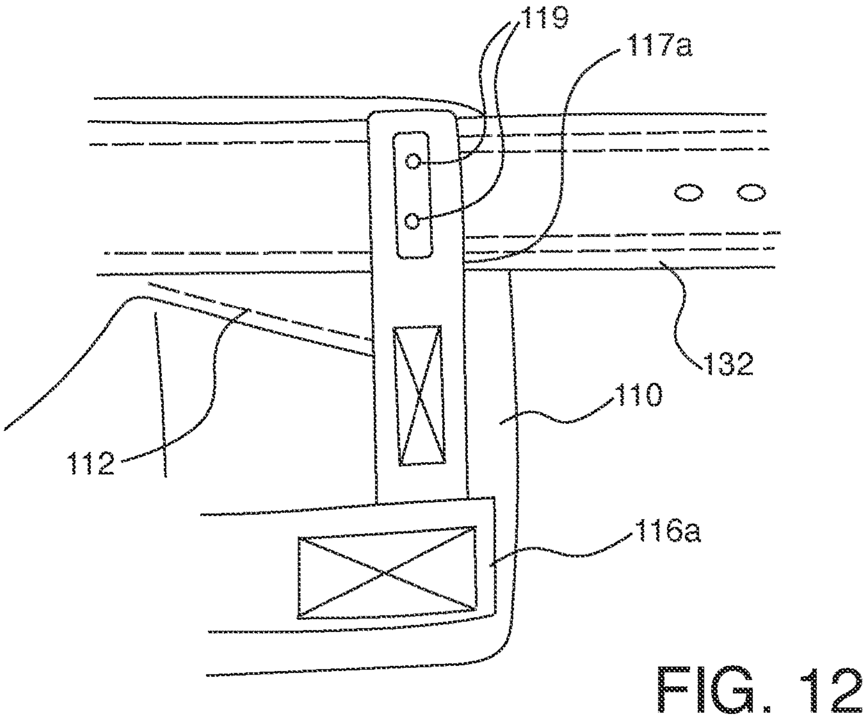
FIG. 12 is a plan view of one end of the belt body showing a safety strap, drop strap and belt tongue.
Figure 14:
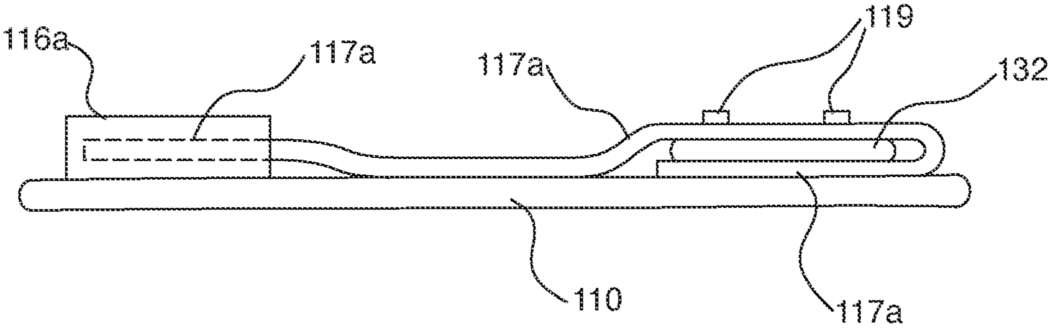
FIG. 14 is a side elevation view of the side of the body showing the drop strap assembled and connected to the safety strap, body and belt tongue.

As shown in FIGS. 10-12, the drop strap 117*a* may be permanently secured to the body 110 of the adjustable lineman safety belt 100. It may be secured to the body 110 anywhere along the length of the drop strap 117*a*, including anywhere between the terminal ends thereof. It may be secured to the body 110 through permanent affixation such as but not limited to stitching through the body 110, adhesive or other suitable methods. The drop strap 117*a* is also secured to the safety strap 116*a* on the same side of the body 110. As shown in FIGS. 8 and 9, when the terminal end of the safety strap 116*a* is being secured to the body 110, such as by being looped over onto itself and stitched to the body 110, the drop strap 117*a* such as one terminal end thereof is positioned between the layers of safety strap 116*a* before stitching or other affixation to the body 110. Accordingly, the drop strap 117*a* is layered with the safety strap 116*a* and is affixed to the body 110 through the same stitching or fastening method. The drop strap 117*a* may be positioned non-coaxially relative to the safety strap 116*a*, such as at an oblique angle or substantially perpendicular to the safety strap 116*a* as shown in FIGS. 8-12 and 14. This placement allows the drop strap 117*a* to extend from the safety strap 116*a* across the body 110 and to the belt tongue located at the opposite longitudinal edge of the body 110. Accordingly, the drop strap 117*a* may extend at, near or in proximity to a lateral edge of the body 110, though it may also be located further inward on the body 110. It may therefore also provide additional support to and shore up the body 110 between the auxiliary and primary strap 140, 120. The drop strap 117*a* may be straight or curved.

Figure 13:
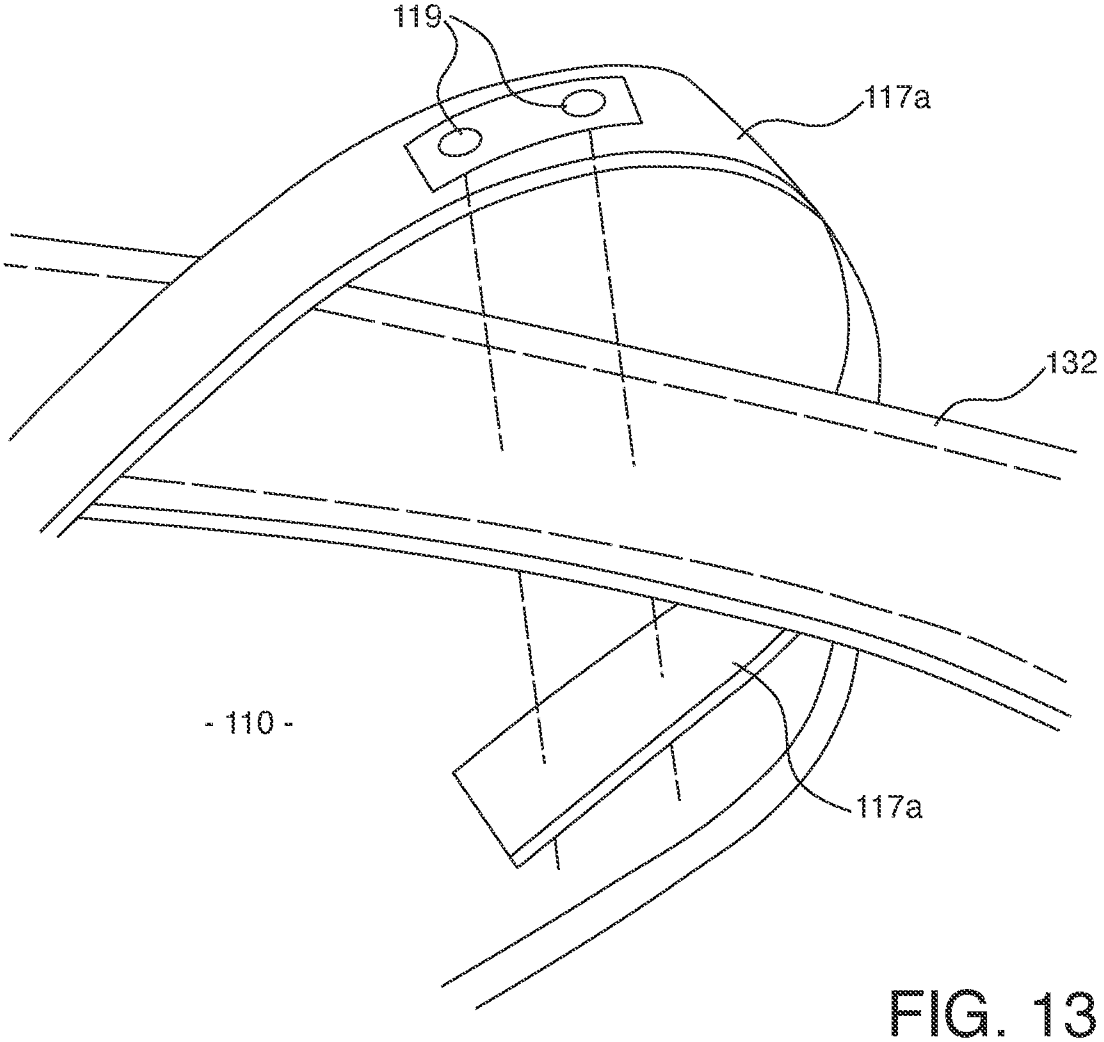
FIG. 13 is an exploded view showing the attachment of a drop strap to the belt tongue and body.

As shown in FIGS. 11-14, the drop strap 117*a* also extends up and over the belt tongue 132 and is secured to the belt tongue 132, such as by rivets 119, stitching or other permanent fasteners. The end of the drop strap 117*a* opposite from the safety strap 116*a* is secured to the belt tongue 132 at the other end of the body 110. In at least one embodiment, as shown in FIGS. 11-14, the drop strap 117*a* is looped over and around the belt tongue 132 and back onto itself before being secured to the body 110. Thus, the belt tongue 132 is layered between the drop strap 117*a* above and below. The drop strap 117*a* may be at least affixed to the belt tongue 132, such as through rivets 119 or other permanent fastener, or the fasteners may also secure the drop strap 117*a* and belt tongue 132 to the body 110, as shown in FIG. 13. In this manner, the drop strap 117*a* secures the belt tongue 132 to the body 110, either directly through rivets 119 or indirectly through stitching along the length of the drop strap 117*a* to the body 110 intermediate between its ends.

The adjustable lineman safety belt 100 also includes a cover in proximity and covering relation to each of the adjustment members to prevent them from accidental movement or adjustment during use. For instance, the belt tongue 132 may form a first cover 133 over the first adjustment member 125, as seen in FIG. 15. In this case, the first cover 133 is disposed over and spaced apart from the first adjustment member 125 and prevents accidental bumping of the adjustment member 125 by the belt tongue 132 or tools held thereon. This may be accomplished by the shape and configuration of the first cover 133 as it passes over the adjustment member 125, as well as the material used such as leather that is sufficiently stiff to hold its shape and provide structural support when formed. For instance, the first cover 133 has a larger dimension than the first adjustment member 125 and so covers and at least partially obscures the first adjustment member 125. However, the first cover 133 is also open on the side, allowing the adjustment member 125 to be accessed by the user when desired for selective adjustment but only from certain approaches.

Figure 17:
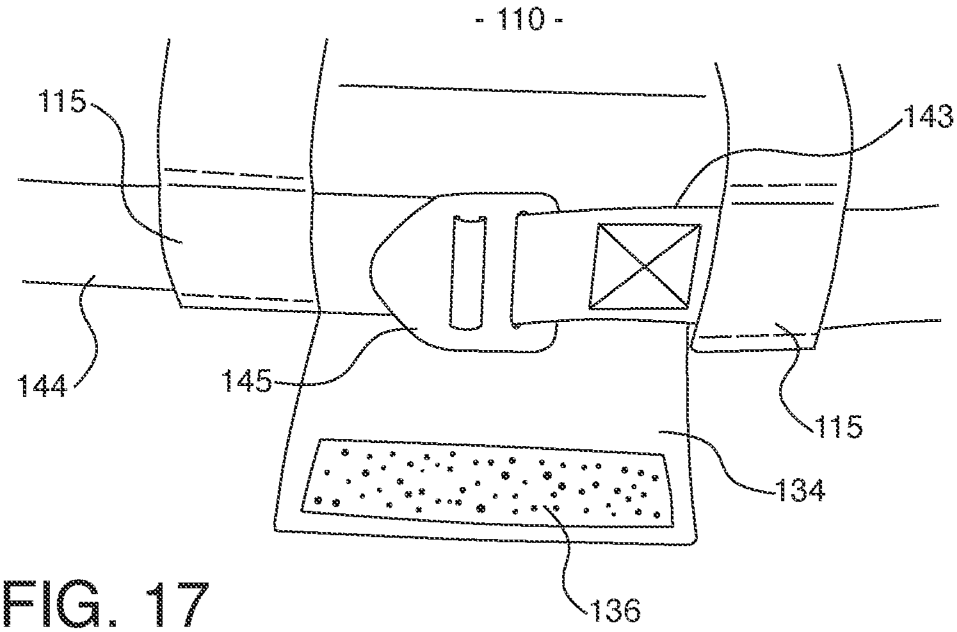
FIG. 17 is a detailed view of a second embodiment of a second cover, shown in an open position.
Figure 16:
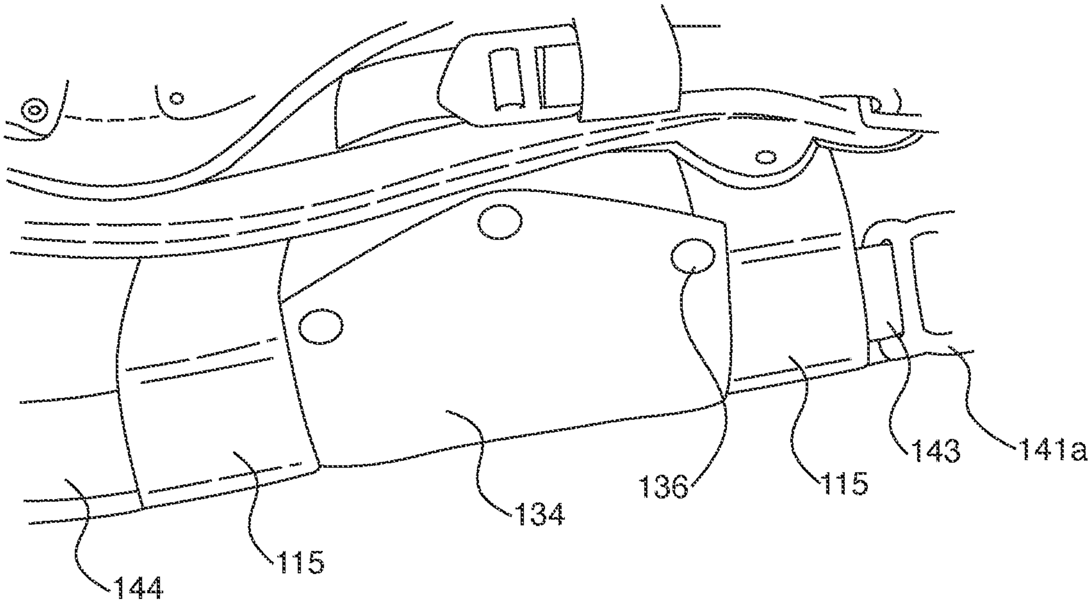
FIG. 16 is a detailed view of a first embodiment of a second cover, shown in a closed position over the auxiliary strap.

The adjustable lineman safety belt 100 also includes a second cover 134 positioned in proximity to the second adjustment member 145. The second cover 134 is selectively movable between an open position in which the second adjustment member 145 is fully accessible and a closed position in which the second cover 134 is positioned over the second adjustment member 145 to cover it and prevent it from being accessed. Accordingly, the second cover 134 may be fully covering the second adjustment member 145 in the closed position. The second cover 134 may include a panel that is larger than the dimensions of the second adjustment member 145 so as to fully cover and/or obscure the second adjustment member 145 when placed over it in the closed position. The second cover 134 is selectively releasably securable to the body 110 by at least one fastener 136, which may be snaps as seen in FIGS. 1, 15 and 16, hook and loop fasteners such as VELCRO® fasteners as seen in FIG. 17, buttons, or the like. Accordingly, the user may move the second cover 134 between the open and closed positions when they choose. For instance, they may move the second cover 134 to the open position so the length of the auxiliary strap 140 may be adjusted, then may move the second cover 134 to the closed position once the length of the auxiliary strap 140 is set to keep the second adjustment member 145 from being accidentally bumped while in use, thereby keeping the length of the auxiliary strap 140 secured during use.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. An adjustable lineman safety belt, comprising:

a body having a longitudinal length;

a primary strap extending along said length of said body, said primary strap securely affixed to a first primary D ring at one terminal end and securely affixed to a second primary D ring at an opposite terminal end and defining a primary D ring distance therebetween, said primary strap having a fixed portion of a fixed length and an adjustable portion of an adjustable length, said adjustable portion selectively adjustable to vary said primary D ring distance;

a first adjustment member interposed in said primary strap between said fixed portion and said adjustable portion of said primary strap, said fixed portion securely affixed to said first adjustment member and said adjustable portion selectively releasably secured to said first adjustment member;

an auxiliary strap extending along said length of said body and spaced apart from said primary strap, said auxiliary strap securely affixed to a first auxiliary D ring at one terminal end and securely affixed to a second auxiliary D ring at an opposite terminal end and defining an auxiliary D ring distance therebetween and an auxiliary axis extending through said first auxiliary D ring and said second auxiliary D ring, said length of said auxiliary strap extending along said auxiliary axis, said auxiliary strap having a fixed portion of a fixed length and an adjustable portion of an adjustable length, said adjustable portion selectively adjustable to vary said auxiliary D ring distance along said auxiliary axis;

a second adjustment member interposed in said auxiliary strap between said fixed portion and said adjustable portion of said auxiliary strap, said fixed portion securely affixed to said second adjustment member and said adjustable portion selectively releasably secured to said second adjustment member;

a safety strap having a first terminal end and an opposite second terminal end and a length defined therebetween, said first terminal end of said safety strap securely affixed to said auxiliary strap in proximity to said first auxiliary D ring, said second terminal end of said safety strap securely affixed to said body at a location between said first auxiliary D ring and a peripheral edge of said body distal from said first auxiliary D ring, said safety strap having sufficient slack and sized to permit movement of said auxiliary strap relative to said body;

wherein said adjustable portions of said primary and auxiliary straps are separately and independently adjustable to vary said respective primary and auxiliary D ring distances, and wherein the length of said safety strap limits a maximum auxiliary D ring distance from said body.

2. The adjustable lineman safety belt as recited in claim 1, wherein said primary and auxiliary straps are separately and independently adjustable to maintain said first and second primary D rings at a substantially equivalent distance from a midpoint of said body and to maintain said first and second auxiliary D rings at a substantially equivalent distance from a midpoint of said body.

3. The adjustable lineman safety belt as recited in claim 1, wherein said adjustable portions of said primary and auxiliary straps are each slidably affixed to said first and second adjustment members, respectively.

4. The adjustable lineman safety belt as recited in claim 1, wherein said safety strap is securely affixed between layers of said auxiliary strap in proximity to said first auxiliary D ring.

5. The adjustable lineman safety belt as recited in claim 1, wherein said safety strap is a first safety strap, and further comprising a second safety strap having a first terminal end and an opposite second terminal end and a length defined therebetween, said first terminal end of said second safety strap securely affixed to said auxiliary strap in proximity to said second auxiliary D ring, said second terminal end of said second safety strap securely affixed to said body at a location between said second auxiliary D ring and a peripheral edge of said body distal from said second auxiliary D ring, said second safety strap having sufficient slack and sized to permit movement of said auxiliary strap relative to said body.

6. The adjustable lineman safety belt as recited in claim 5, wherein each of said first and second safety straps is secured to said body at a perimeter of said body and limits a maximal extension of said auxiliary D ring distance.

7. The adjustable lineman safety belt as recited in claim 1, further comprising a drop strap having a length defined between terminal ends, said drop strap affixed to said safety strap at one terminal end and affixed to said body by at least one of said length of said drop strap and an opposite terminal end of said drop strap, said drop strap extending substantially transversely from said safety strap.

8. The adjustable lineman safety belt as recited in claim 7, further comprising a belt tongue disposed coaxially with and adjacent to said primary strap, said belt tongue extending beyond said body and dimensioned to fully encircle the waist of a user when worn to secure said adjustable lineman safety belt to a user, said drop strap disposed substantially perpendicularly to said belt tongue and secured to said belt tongue.

9. The adjustable lineman safety belt as recited in claim 8, said belt tongue positioned between layers of said drop strap.

10. The adjustable lineman safety belt as recited in claim 1, further comprising a cover in covering relation to each of said first and second adjustment members.

11. The adjustable lineman safety belt as recited in claim 10, further comprising a first cover in covering relation to said first adjustment member and a second cover in covering relation to said second adjustment member, wherein said first cover is a portion of a belt tongue disposed coaxially with and adjacent to said primary strap said portion of said belt tongue forming said first cover having larger dimensions than said first adjustment member and at least partially obscuring said first adjustment member, and wherein said second cover is secured to said body, has a larger dimension than said second adjustment member and is selectively movable between an open position defined by said second adjustment member being fully accessible and a closed position defined by said second cover being positioned in covering and obscuring relation to said second adjustment member.

12. The adjustable lineman safety belt as recited in claim 11, said second cover including at least one fastener configured to selectively and releasably secure said second cover to said body in said closed position.

13. The adjustable lineman safety belt as recited in claim 1, further comprising at least one primary sleeve secured to said body and dimensioned to slidably receive and retain said primary strap and to restrict passage of said first and primary D rings and said first adjustment member therethrough.

14. The adjustable lineman safety belt as recited in claim 13, wherein said at least one primary sleeve limits a minimal length of said primary D ring distance.

15. The adjustable lineman safety belt as recited in claim 1, further comprising at least one auxiliary sleeve secured to said body and dimensioned to slidably receive said auxiliary strap and to restrict passage of said first and auxiliary D rings and said second adjustment member therethrough.

16. The adjustable lineman safety belt as recited in claim 15, wherein said at least one auxiliary sleeve limits a minimal length of said auxiliary D ring distance.

17. The adjustable lineman safety belt as recited in claim 1, further comprising a sizing guide having indicia denoting different primary D ring distances and auxiliary D ring distances, said sizing guide located on at least one said auxiliary strap, said primary strap, said belt pad and said body.

18. The adjustable lineman safety belt as recited in claim 17, wherein each of said primary strap and said auxiliary strap includes a sizing guide.

19. An adjustable lineman safety belt, comprising:

a body having a longitudinal length;

a primary strap extending along said length of said body, said primary strap securely affixed to a first primary D ring at one terminal end and securely affixed to a second primary D ring at an opposite terminal end and defining a primary D ring distance therebetween, said primary strap having a fixed portion of a fixed length and an adjustable portion of an adjustable length, said adjustable portion selectively adjustable to vary said primary D ring distance;

a first adjustment member interposed in said primary strap between said fixed portion and said adjustable portion of said primary strap, said fixed portion securely affixed to said first adjustment member and said adjustable portion selectively releasably secured to said first adjustment member;

an auxiliary strap extending along said length of said body and spaced apart from said primary strap, said auxiliary strap securely affixed to a first auxiliary D ring at one terminal end and securely affixed to a second auxiliary D ring at an opposite terminal end and defining an auxiliary D ring distance therebetween and an auxiliary axis extending through said first auxiliary D ring and said second auxiliary D ring, said length of said auxiliary strap extending along said auxiliary axis, said auxiliary strap having a fixed portion of a fixed length and an adjustable portion of an adjustable length, said adjustable portion selectively adjustable to vary said auxiliary D ring distance along said auxiliary axis;

a second adjustment member interposed in said auxiliary strap between said fixed portion and said adjustable portion of said auxiliary strap, said fixed portion securely affixed to said second adjustment member and said adjustable portion selectively releasably secured to said second adjustment member;

a safety strap having a first terminal end and an opposite second terminal end and a length defined therebetween, said first terminal end of said safety strap securely affixed to said auxiliary strap in proximity to said first auxiliary D ring, said second terminal end of said safety strap securely affixed to said body at a location between said first auxiliary D ring and a peripheral edge of said body distal from said first auxiliary D ring, said safety strap having sufficient slack and sized to permit movement of said auxiliary strap relative to said body;

wherein said adjustable portions of said primary and auxiliary straps are separately and independently adjustable to vary said respective primary and auxiliary D ring distances while maintaining said first and second primary D rings at a substantially equivalent distance from a midpoint of said body and maintaining said first and second auxiliary D rings at a substantially equivalent distance from a midpoint of said body, and wherein the length of said safety strap limits a maximum auxiliary D ring distance from said body.

* * * * *